March 23, 1965 C. THUMIM 3,174,370
MAGNETIC TAPE CONTROL SYSTEMS FOR
GUILLOTINE TYPE CUTTING MACHINE
Filed Sept. 16, 1959 8 Sheets-Sheet 1

INVENTOR.
CARL THUMIM
BY
ATTORNEYS

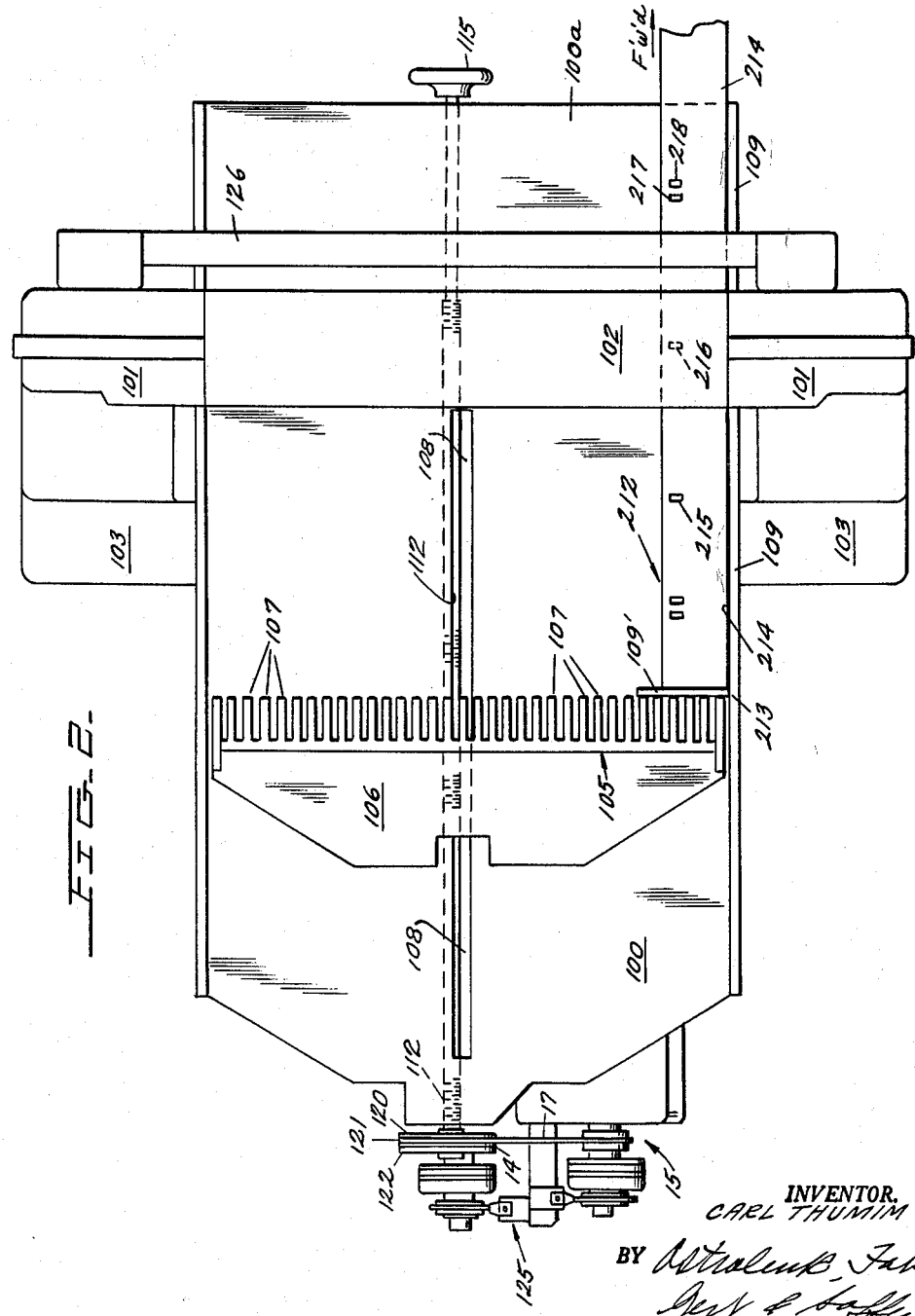

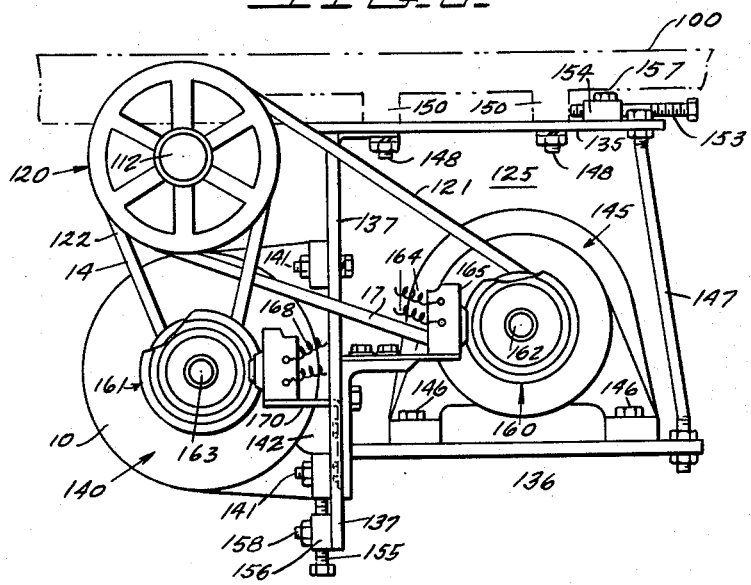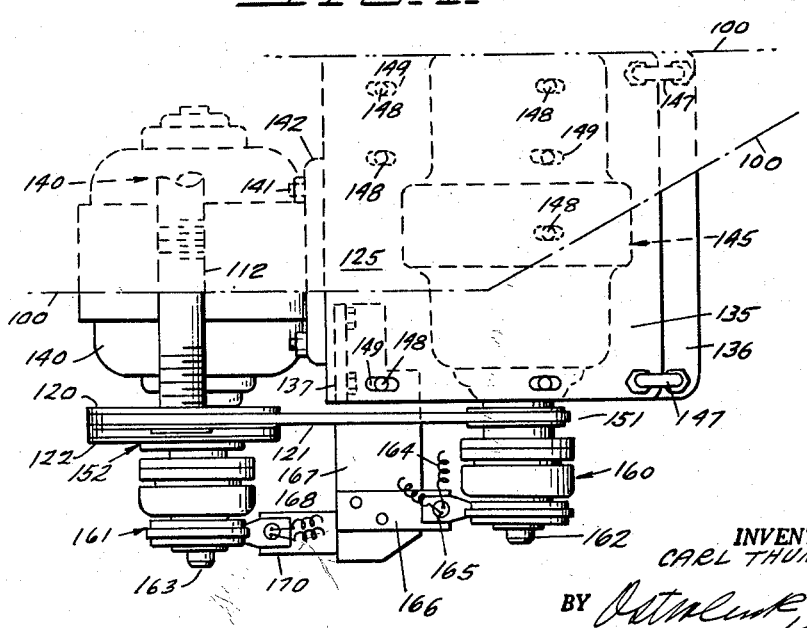

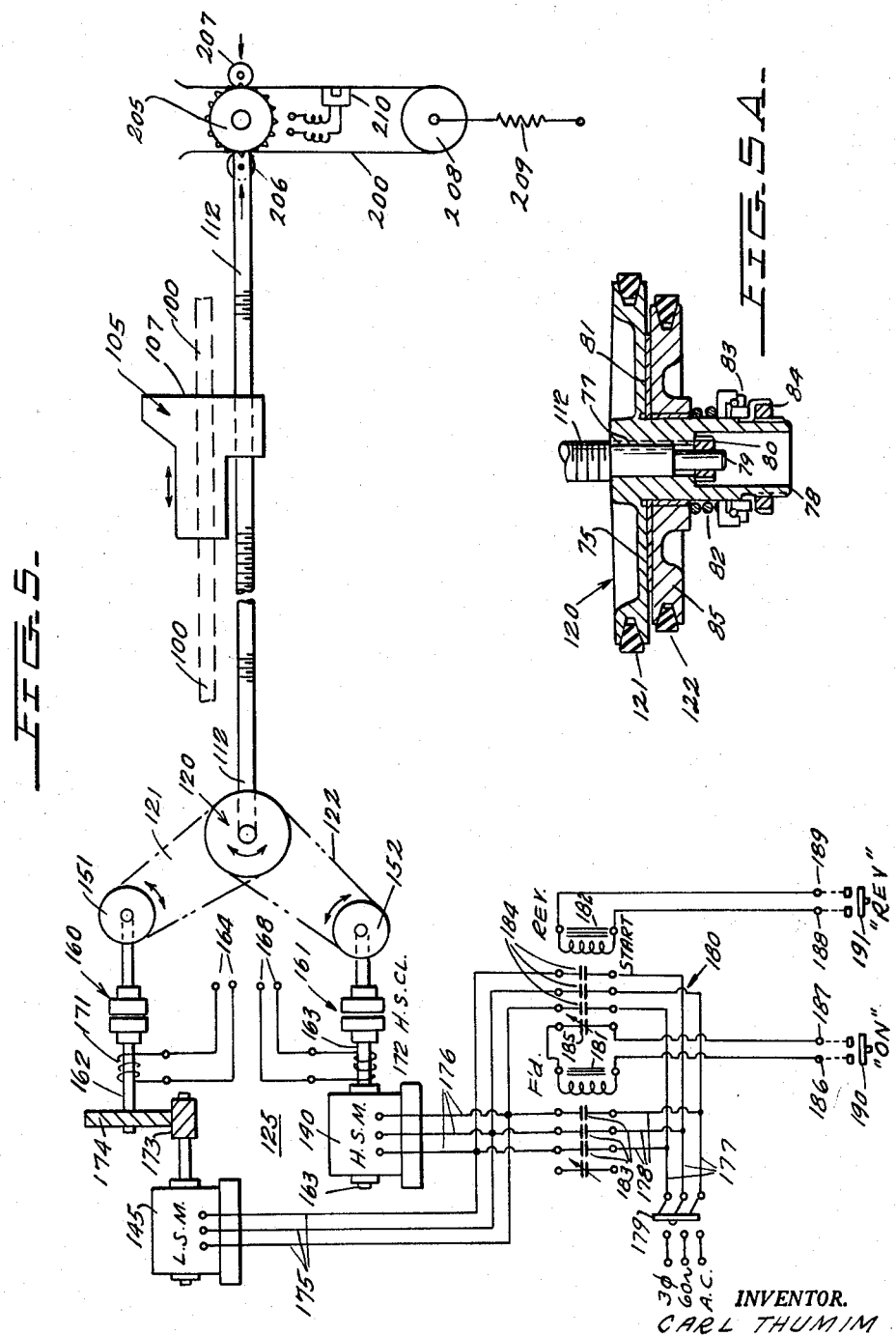

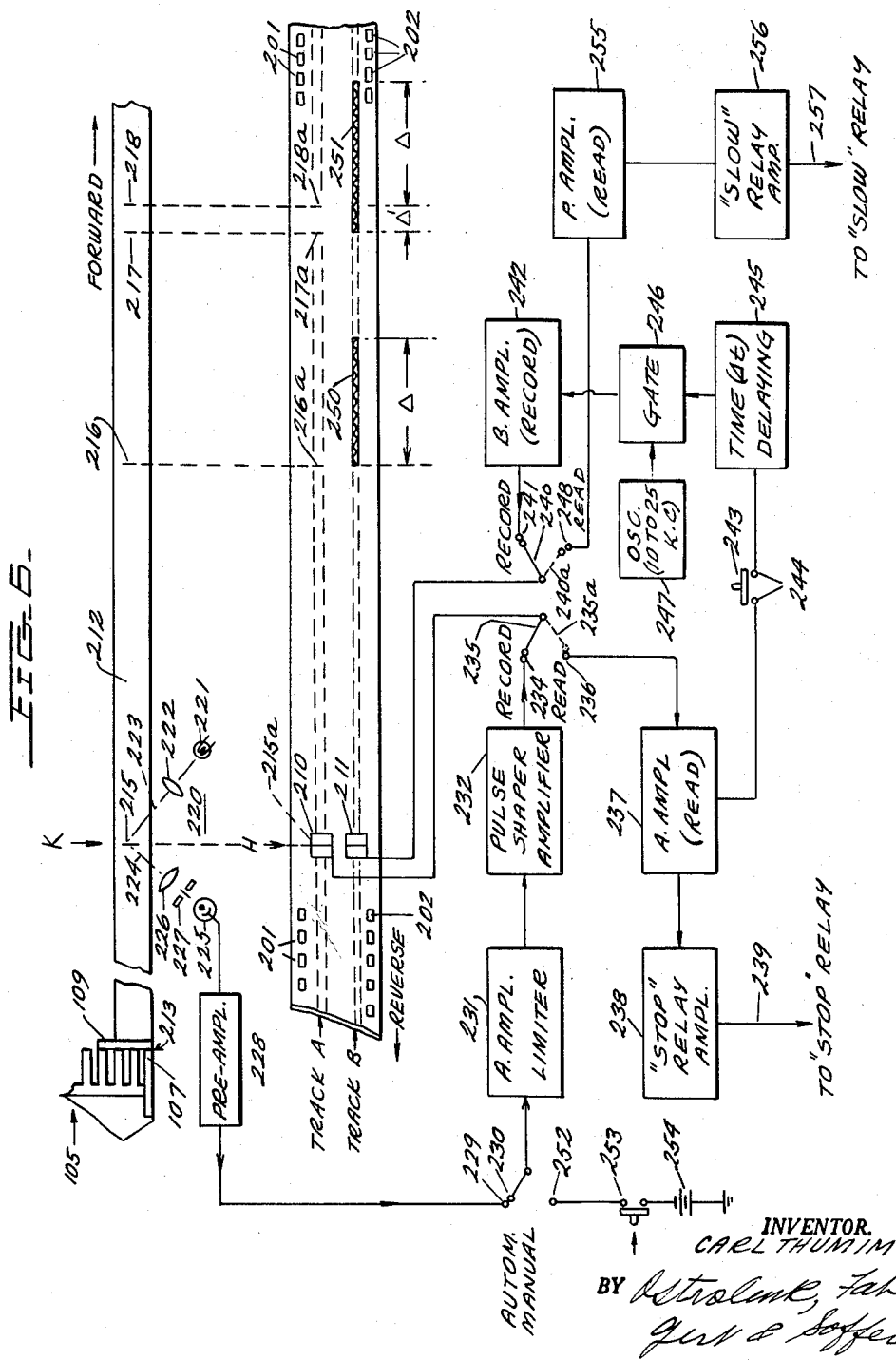

March 23, 1965

C. THUMIM 3,174,370

MAGNETIC TAPE CONTROL SYSTEMS FOR
GUILLOTINE TYPE CUTTING MACHINE

Filed Sept. 16, 1959

INVENTOR.
CARL THUMIM

BY *[signature]*

ATTORNEYS

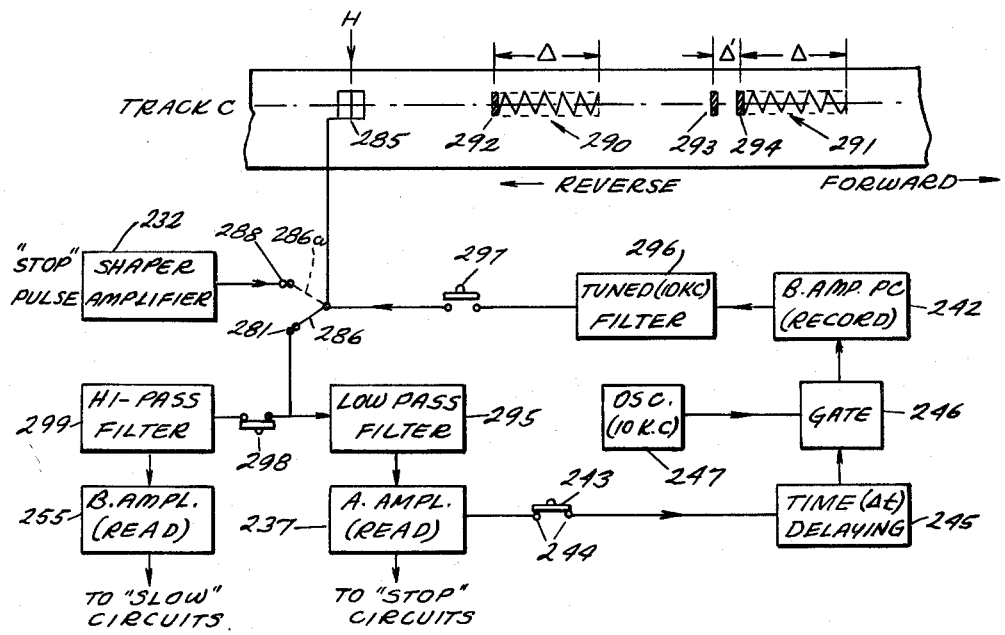
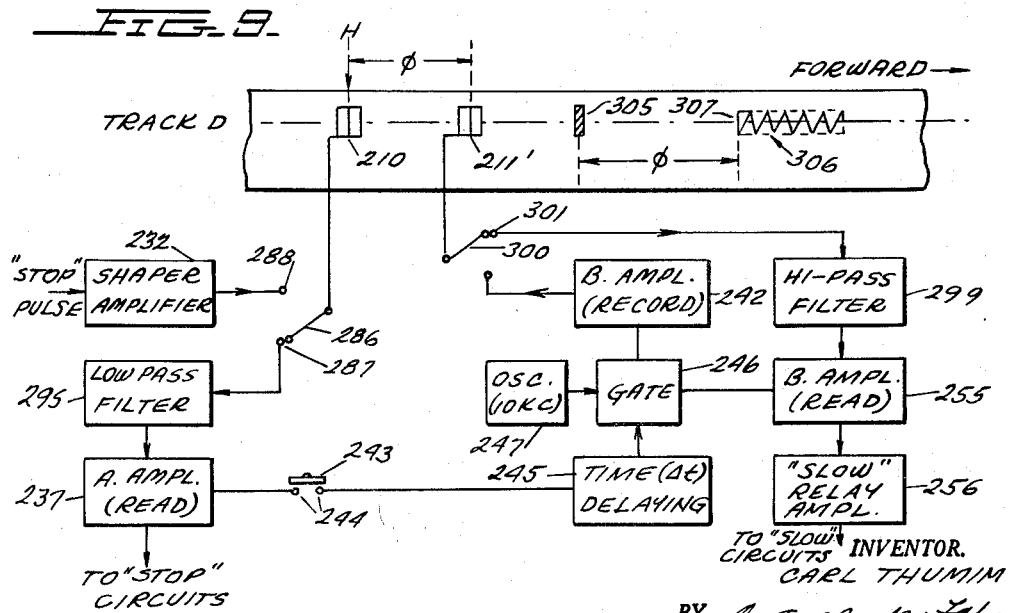

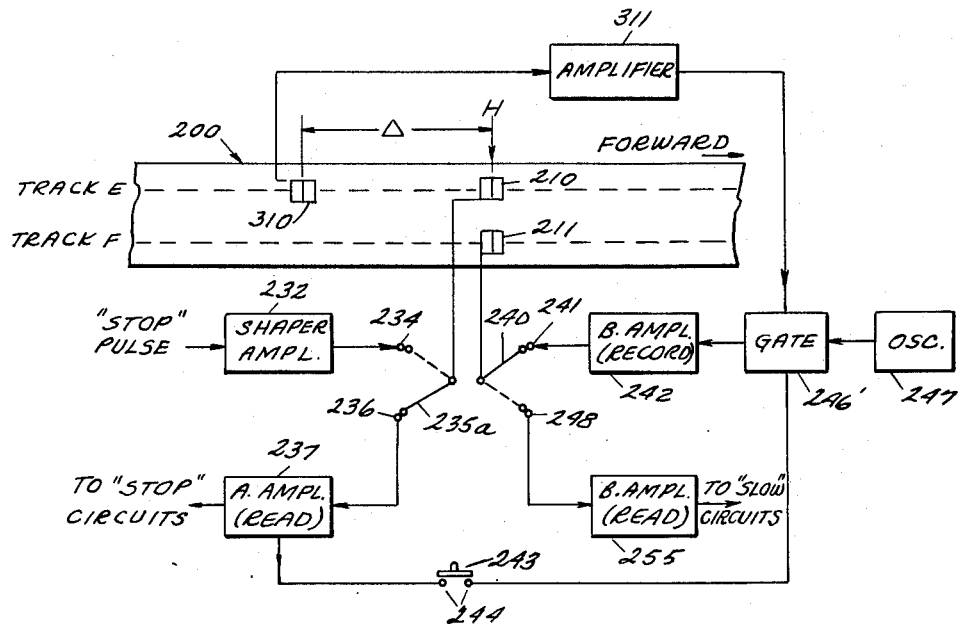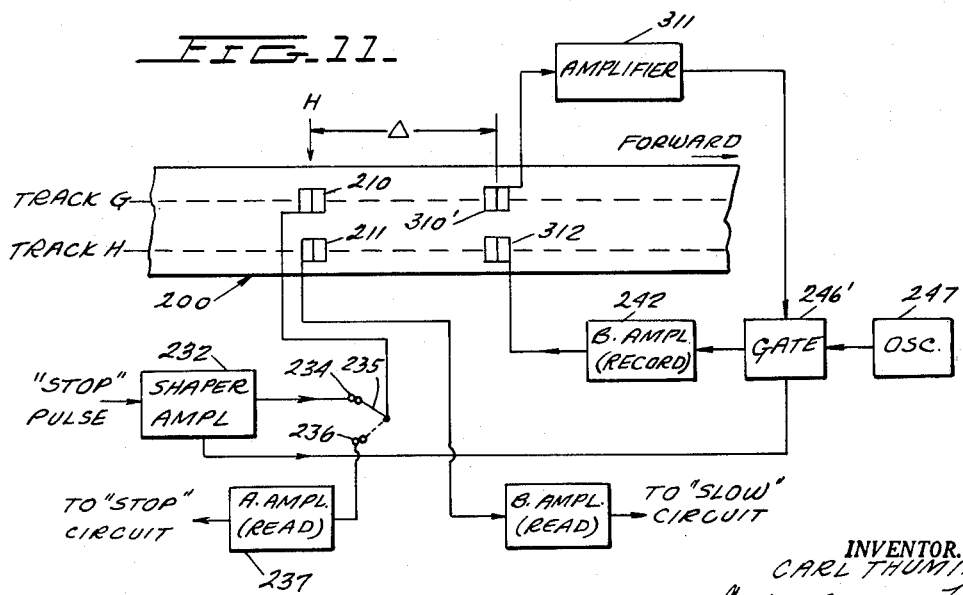

United States Patent Office 3,174,370
Patented Mar. 23, 1965

3,174,370
MAGNETIC TAPE CONTROL SYSTEMS FOR GUILLOTINE TYPE CUTTING MACHINE
Carl Thumim, Westbury, N.Y., assignor, by mesne assignments, to Miehle-Goss-Dexter, Inc., a corporation of Delaware
Filed Sept. 16, 1959, Ser. No. 840,281
3 Claims. (Cl. 83—71)

This invention relates to magnetic tape control systems for controlling the operation of the back gauge of guillotine type cutting machines.

In the operation of guillotine type paper cutters, a pile of paper is placed on the work table beneath the cutting knife. The back gauge provided on the work table is adjusted so that the portion of the pile which it is desired to cut off extends forward of the cutting knife edge. Thus, when the reciprocable knife blade is brought down, it will be cut off an exactly dimensioned section of the pile.

In operating paper cutters of this type, it frequently becomes necessary to adjust the position of the back gauge many times for the different cuts which are to be made, such as on a printed pile of sheets. Even if a plurality of regular cuts are to be made from a single pile, the back gauge must be moved up each time to a precise position, with the forward edge of the motivated pile perfectly squared, so that the exact desired cut may be made.

In general usage, the heavy stack of sheets on the work table is brought up rapidly by the back gauge to near the point where it is to be stopped. Thereafter, it is slowed down, and then finally brought to a stop. Such slow-down interval prevents a sudden stop of the heavy back gauge and avoids causing the heavy paper pile to cross beyond a predetermined position.

The final speed of the back gauge may be as little as 1% of the fast forward speed at which the paper pile is brought up close to the slow-down and stopping position. Preferably, the reinitiation of the back gauge cycle of operation to the next cutting position is arranged so that the lifting of the knife and clamp clear of the paper pile towards their nesting position resets the control apparatus through a switch.

Reference is made to my copending patent application Serial No. 580,200, filed on April 24, 1956, now Patent No. 2,860,705, for "Photo-Electric Controlled Back Gauge," assigned to the assignee of this case. The present invention is in the nature of an improvement over such prior methods that utilize photo-electric scanning of signal bars. The signal bars therefore were bulky hexagonal members that required careful handling and storage. Precision placement of signals along the bar in accordance with a mechanically preset program of cutting generally required a large amount of skilled labor time. The program bars were precision units and costly.

In accordance with the present invention I provide novel magnetic tape arrangements that automatically provide an accurate reusable program record in less than one minute or one that can be set up manually point by point. Also, the cost of the program record is negligible, with no storage problems. One tape may readily contain twelve, twenty-four or more programs, each readily and directly selectable. A simple template marked with the cutting stop positions for any program to be set-up is scanned, and synchronized for creating corresponding magnetic tape signals.

An important feature of the present invention is the novel dual magnetic control effected on the back gauge drive to decelerate its fast forward motion to a slow speed for a predetermined interval before each stop position.

Commercial cutting machines today use a seven inch per second fast forward (and reverse) speed. The slow speed drive is of the order of one-thirtieth thereof, or 0.20" per second. The massive back gauge may now readily stop on the magnetic stop signal without overshoot.

The aforesaid application discloses a dual motor drive with both high and slow speed connections to the back gauge. The magnetic control system of the present case initiates the slow speed drive, disconnecting the high speed one, during a predetermined interval before each magnetic stop signal. This is accomplished by utilizing a distinctive slow period magnetic signal which is impressed upon the tape for a distance corresponding to say one-seventh of a second prior to the "stop," or for about one-inch of travel of the back gauge. Such interval may, of course, be different for particular machines. The one second interval has been found to work out very satisfactorily for large cutting machines.

The magnetic control system of the present invention involves, on one embodiment, a novel dual track control, with a magnetic pulse impressed on the "stop" track for each synchronized stop position. Such positions are determined by photo-electric scanning of a linear template of each program, with pulse signals created for recording on this track. The companion track is impressed with a high frequency signal by circuit means initiated by the pre-edetermined interval ahead of the stop signal position. In this manner, two pick-up heads and associate circuitry effect the aforesaid control on the dual speed back gauge drive. Alternatively, a single control track and pick-up head can be used.

When the cutting machine is used to cut labels or other materials printed upon the sheets of the pile of paper, the back gauge may be required to move forward an inch or more between each cutting operation. However, on printed sheets where many narrow rows of labels or the like appear, or narrow spaces that must be cut out between labels, after the back gauge has been moved forward several cycles of fast to slow speed to stop, for cutting a series of printed wide label rows, it would become necessary that the back gauge be moved forward by only a fraction of an inch to permit the cutting or trim out of narrow labels or small unprinted strips. In the latter case, after a main cut, the back gauge should move forward at its slow speed and then come to a stop for the nearby trim-out cut. The invention system effects such action in that where any "stop" signal is called for prior to the expiration of the one-seventh second "slow" signal, the "slow" signal is correspondingly extended a full one-seventh of a second. Further, in accordance with the invention hereof, a novel photo-electric scanning unit, which may be portable as will be shown is provided having means for predetermined clamping with respect to the knife cutting edge. The scanning spot is thereby directed at the template markings as they pass the cutting edge position. With the magnetic tape synchronized with the back gauge and template moved thereby, precisely located "stop" signals are recorded on the tape by the scanner and associated circuitry as will be set forth in details hereinafter. When the back gauge is moved forward, in operation, the tape is driven forward therewith, and the pick-up heads derive the control signals for accurate slowing down and stopping of the back gauge, automatically.

The magnetic tape, control heads and drive therefor are housed in a relatively compact space in the machine body. Utilizing sprocket driven film of conventional 35 mm. size, magnetically coated, I obtain twelve dual or 24 single control tracks or programs. A rugged, accurate, long lasting practical apparatus is provided herein. The magnetic heads are selectively positioned with respect to the desired tracks or programs by simple novel mechanism to be described. Also, the insertion and removal of the magnetic tape is readily performed and directly indexed as will be set forth.

It is accordingly an object of the present invention to provide a novel magnetic control system for programmed deceleration and stopping of a back gauge of a cutting machine.

Another object of the present invention is to provide a novel magnetic control system synchronized with desired programs for stopping a back gauge, with novel magnetic means for decelerating the back gauge in predetermined relation to the stops.

A further object of the present invention is to provide a novel magnetic control system for the multiple programming of a back gauge of a cutting machine into "slow" and "stop" positions.

Still another object of the present invention is to provide a novel magnetic control system with circuit arrangements for synchronously impressing signals on a magnetic tape for programming predetermined "slow" and "stop" control positions of a back gauge.

A still further object of the present invention is to provide a novel magnetic control system for a guillotine cutting machine, with a plurality of programs directly selectable for operation of the back gauge thereof.

These and further objects of this invention will become more apparent from the following description of exemplary embodiments thereof, illustrated in the accompanying drawings, in which:

FIGURE 2 is a plan view of the machine of FIGURE 1.

FIGURE 3 is an end view of the motor drive mechanism for the back gauge corresponding to FIGURES 1 and 2, enlarged to show details thereof, being the view taken at line 3—3 of FIGURE 1 in the direction of the arrows.

FIGURE 4 is a plan view of the motor drive mechanism shown in FIGURE 3, with the work table thereof partially broken away.

FIGURE 5 is a schematic showing of the exemplary back gauge drive and magnetic control tape synchronized therewith.

FIGURE 5A is a cross sectional view through the dual pulley drive section of the motor drive mechanism.

FIGURE 6 is a schematic diagram of an exemplary magnetic tape control system; and circuitry therefor.

FIGURES 8 through 11 are diagrams of modified magnetic tape control systems in accordance with the invention.

Figure 1:
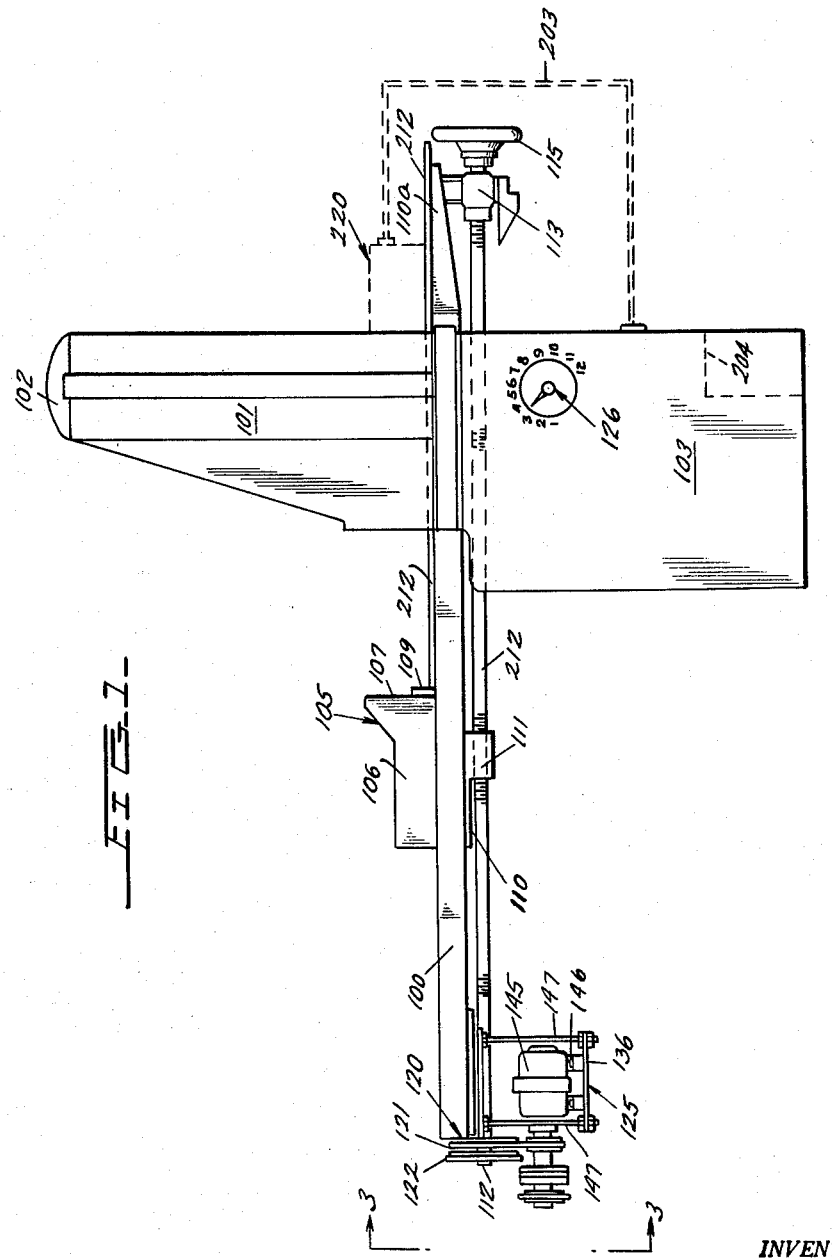
FIGURE 1 is a side elevational view of a guillotine paper cutting machine incorporating the invention system.

FIGURES 1 and 2 illustrate a typical paper cutting machine structure, as illustrated in the aforesaid patent application. The cutting machine comprises a work table 100 carried between upright side frame casings 101, 101. Side frame casings 101, 101 are cross-braced by crossmember 102. Work table 100 and side frame members 101, 101 extend from and are basically secured to base 103 of the cutter machine.

The paper cutting mechanism comprises a reciprocable knife blade arranged between side frame casings 101, 101 and cross member 102. A suitable clamping arrangement is generally provided with the cutting knife mechanism. The mechanism for operating the reciprocable cutting blade and clamp is generally contained underneath the work table 100 and within the base 103. The cutting blade assembly and its operating mechanism are not shown in the drawings, for clarity purposes, as they form no particular feature of novelty per se, it being understood that suitable means well known in the art are utilized therefor.

Back gauge 105 comprises a metal casting 106 which extends transversely across cutting table 100. Back gauge 105 has a plurality of forward extensions 107 seen in FIGURE 2. The aligned front edges of forward extensions 107 form the back gauge surface which coacts with the pile of sheets to be cut by the machine. Work table 100 is provided with a central longitudinal slot 108 through which a depending bracket 100 of back gauge 105 extends downwardly. The slot 108 forms a track for the back gauge bracket 110 and for the back gauge in its longitudinal traverse along work table 100. A nut 111 is formed in an extension of the back gauge bracket 110 and is in threaded engagement with the back gauge feed screw 112.

It is understood that rotation of feed screw 112 causes back gauge 105 to traverse work table 100 longitudinally in a forward or rearward direction depending on the sense of rotation of the feed screw; and that the speed of traverse of back gauge 105 is proportional to the rate of rotation of the feed screw. Furthermore, in view of the positive engagement between feed screw 112 and nut 111 of the back gauge, accurate positioning of the back gauge is feasible as will be set forth.

Feed screw 112 is rotatably carried beneath slot 108 of work table 100, in front bearing 113 mounted under the forward extension 100a of table 100, and the rear bearing at the opposite end. The front end (right) of feed screw 112 is provided with a hand wheel 115 for manual operation of the back gauge 105 through the feed screw. The rear end (left) of back gauge lead screw 112 is provided with a double pulley 120. Two drive belts 121, 122 coact with pulley 120 through the motor drive mechanism 125 under the control of the automatic and/or manual control, to be described. Lead screw 112 is mounted so that while it may rotate freely, it has no longitudinal movement. Accordingly, rotation of screw 112 by either operating mechanism 125 through pulley 120, or manually through hand wheel 115, results in a corresponding longitudinal movement of the back gauge 105 across work table 100 at a speed and direction in accordance with the rotation of lead screw 112.

The back gauge 105 is automatically programmed in its start, slow stop cycles by the magnetic control system, located for example in base 103, and the operating motor drive 125 controlled thereby as will be described in detail. The tape channel or program selector 126 is seen at the side of base 103. A simple turn of detented selector 126 promptly places the desired program in action. The exact location of back gauge 105, or rather the exact distance of its operating front face 107 from the cutting knife edge position is indicated at the front of the cutter machine for the operation. Approximate indicating means, not shown but well known in the art, is provided therefor.

*Electric motor drive system*

The electric drive system 125 operates on the rear end of back gauge lead screw 112 through double grooved pulley 120 secured to the lead screw. FIGURES 3 and 4 illustrate a particular embodiment for the motor drive 125 supported beneath the rear end (left) of the work table 100. Work table 100 is shown in dotted lines in these two figures; and in the plan view of FIGURE 4 is partially broken away, to show the supporting frame 135 for the drive assembly 125. The assembly for the drive mechanism 125 comprises two further frames, namely bottom frame 136 and vertical frame 137 secured between frames 135, 136. Electric drive motor 140 is secured to vertical frame member 137 by a series of bolts 141 through mounting holes in its base 142. Electric drive motor 145 is secured to bottom frame member 136 through suitable bolts 146. The cantilevered (right) side of frame member 136 is supported by stay bolts 147, 147 extending through and secured with top frame member 135. Suitable struts and supporting members are utilized among the three frame members 135, 136, 137 to secure the motor drive structure 125 rigidly as a sub-assembly.

Top frame member 135 is secured to work table 100 by bolts 148 extending through slots in frame member 135 to posts 150 extending from the bottom of work table 100. The motor drive assembly 125 is accordingly adjustable in a direction transverse of work table 100 for the purpose of adjusting for a proper tension in the drive belt 121 connecting pulley 120 with drive pulley 151. Drive pulley 151 is driven by motor 145. Similarly, belt 122 connects the pulley 120 to the drive pulley 152 operated by electric motor 140.

A set screw 153 is shown in FIGURE 3 for adjusting the said transverse position of the motor assembly 125 with respect to the fixed position of lead screw 112. Set screw 153 is rotatably mounted in a threaded post 154 extending from frame 135 and is arranged to abut a post in bed 100. Suitable rotation of set screw 153 creates a desired tension in belt 121 between pulleys 120 and 151. Similarly, motor 140 is slidably mountable on vertical frame member 137, and a set screw 155, mounted in threaded post 156 secured to frame 137 adjusts the position of motor 140 on frame member 137 in a vertical direction. In this manner, the tension in belt 122 between pulleys 120 and 152 is suitably adjusted. It is to be understood that the nuts on the respective bolts 141 and 148 are tightened when the proper tension in belts 121 and 122 is derived; and that the bolts 157, 158 acting on set screws 153, 155 in their respective posts 154, 156 also secure the set screws after the said adjustment.

Electro-magnetic clutches 160 and 161 are incorporated in the electric drive system 125. Eletcro-magnetic clutch 160 is arranged between the output shaft 162 of motor 145 and drive pulley 151; electro-magnetic clutch 161 between output shaft 163 of motor 140 and drive pulley 152. Electro-magnetic clutches 160, 161 may be of any suitable type and construction. Clutch 160 is connected to the electrical control system, as will be set forth, through its coil leads 164 extending from electrical connection block 165 of clutch 160. Block 165 is suitably mounted on bracket 166 fastened to extension support 167, in turn secured to frame 137. Similarly, clutch 161 is connected to the control circuit through its coil leads 168, extending from connection block 169 of clutch 161. Block 169 is mounted on bracket 170 suitably secured to extension bracket 167.

FIGURE 5 diagrammatically illustrates the electric motive system 125 and its drive relationship with back gauge 105 through lead screw 112. Low speed electric motor 145 drives lead screw 112 when its associated electric clutch 160 is engaged. Engagement of electric clutch 160 is accomplished when its clutch coil 171 is suitably energized by the control circuit through its leads 164 in a manner to be described. Likewise, motor 140 operated lead screw 112 through belt 122 when its associated electro-magnetic clutch 161 is actuated. Actuation of clutch 161 occurs when its clutch coil 172 is suitably energized by the control circuits to be described, through its leads 168.

In the illustrated embodiment, motor 140 is a reversible three-phase alternating current induction electric motor operating off a commercial 60 cycle line. Motor 140 is herein the high speed motor termed H.S.M. In the exemplary embodiment of system 125, the H.S.M. motor 140 is operated at 900 r.p.m. The electric motor 145 is also a three-phase 60 cycle induction motor, herein the lower speed motor and termed L.S.M. Motor 145 is preferably an industrial gear down motor shown as having step-down gearing 173, 174. In this embodiment, with output shaft 163 of H.S.M. 140 operated at 900 r.p.m., the output shaft 162 of L.S.M. 145 operates at the low speed of 25 r.p.m.

Selective energization of clutch coils 171 and 172 correspondingly firmly connects pulleys 151 and 152 to the respective motors 145, 140 through magnetic clutches 160 and 161. Motor 145 is connected directly to the leads 176 of motor 140 through leads 175. When clutch 160 of L.S.M. 145 is energized to operate pulley 151, it is motivated in a predetermined direction at a low speed of rotation, as is lead screw pulley 120. Both H.S.M. 140 and L.S.M. 145 are connected to main line 177 through motor starter unit 180. The motors are connectible normally for forward drive, and into reverse by starter 180, as will be described. High speed drive pulley 152 is arranged to turn lead screw 112 in either direction and at the fast speed, in accordance with the actuation through motor starter 180 and clutch 161.

Motor starter unit 180 comprises two solenoids: solenoid 181 for forward or "F'd Start" and solenoid 182 for reverse or "REV. Start." When forward (F'd) start solenoid 181 is energized, normally open starter contacts 183 of motor starter 180 are closed and directly connect leads 175, 176 of motor 140 and 145 to the main three-phase line 177 through leads 178. The main power line 177 is connected to the three-phase 60 cycle A.C. source through electrical switch 179. When the reverse (REV.) Start solenoid 182 is instead energized, the three normally open contacts 184 of motor starter 180 are closed and thereby and in turn also directly connect the motor leads 175, 176 to main line 177, except that two of these leads are reversed in their three-phase relationship as compared to the connections through contacts 183. This causes lead reversal, nad motors 140 and 145 operate in the reverse direction, as will be understood.

Figure 7:
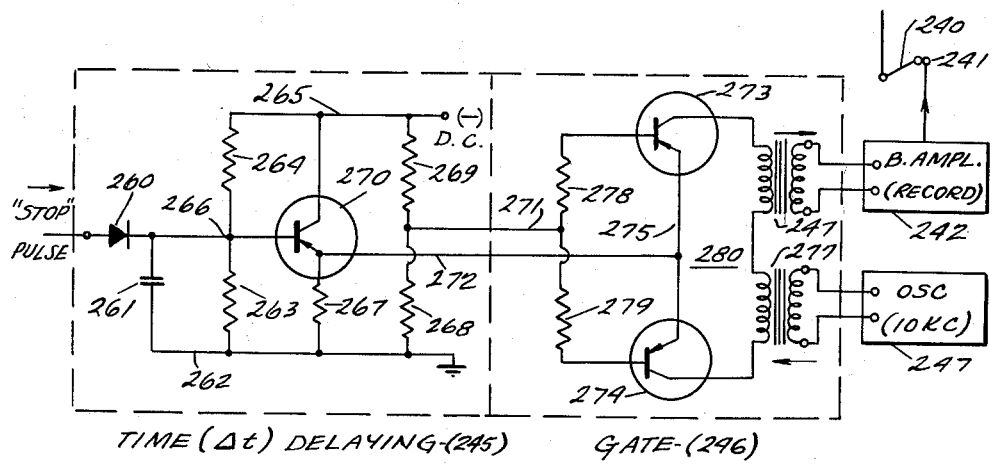
FIGURE 7 is a circuit diagram of a portion of the control system of FIGURE 6.

Upon energization of REV. solenoid 182 for reverse operation of motors 140 and 145, the normally closed contact 185 in the gang of contactors 184 is opened to break in turn a posisble circuit connection to the forward (F'd) Start solenoid 181 in series connection. Thus, when reverse (REV.) solenoid 182 is energized, the forward (F'd) Start solenoid 181 is definitely de-energized and the motor control unit 180 operates motor 140 and 145 in only the one direction and at full speed. Forward solenoid 181 is connected to the control circuit, as shown in FIGURE 7, through 186, 187 which carry solenoid 181 and contacts 185 in series. The REV. start solenoid 182 is connected to the control circuit through leads 188, 189. The forward solenoid 181 is controlled by manual remote switch 190 at leads 186, 187 to energize motors 140, 145 to the solenoid 182 and is controlled by manual remote switch 191 at leads 188, 189 to operate the motors in the "REV" mode or reverse control operation. FIGURE 5A is a cross-sectional view through the pulley arrangement 120 of the motor drive system 125. A basic pulley 75 has a V-belt 121 to the L.S.M. motor 145. Pulley 75 has a hub 76 keyed to back gauge screw shaft 112 at 77. The hub end 78 is hollow, and recessed internally to be held at the end 79 of shaft 112 by nut 80. Pulley 75 is accordingly firmly engaged with screw shaft 112. A second pulley 85 coacts with V-bit 122 from H.S.M. motor 140 for high speed driving. Pulley 85 is firmly frictionally engaged with concentric pulley 75 through a friction disc 81 located between them. The pulleys 75, 85 are clamped together across friction disc 81, by means of compression spring 82. Spring 82 is held in compresison by ball bearing 83 set onto hub extension 78 with lock nut 84.

The slipping pulley 75, 85 arrangement herein eliminates hard jolts in starting. It further eliminates extreme stresses on the driving belts (121, 122) in case the clutch that is deenergized (160, 161) hangs on long enough to overlap the clutch which is being energized, since the two would try to drive the screw shaft 112 at different speeds, and a belt would have to slip. Either belt 121, 122 is thus directly connected with screw shaft 112 to drive the back gauge 105.

The magnetic control tape 200 is driven in positive synchronism with the back gauge, as follows: A sprocket drum 205 is attached to the back gauge screw 112. This securement is shown schematically in FIGURE 5; it will be understood that sprocket 205 is mounted on and keyed to shaft 112 and rotates therewith. The tape 200 has side sprocket holes 201, 202 engaged with drum 205. Rollers 206, 207 keep tape 200 with the drum 205 in engagement. A spring biased pulley 208 through spring 209 maintains tape 200 properly taut at its looped end. A magnetic head 210 is shown coacting with tape 200. Other equivalent arrangements are feasible. The linear positioning of the tape 200 with respect to fixed head 210 is thus accurately and proportionally related to the back gauge 105 positions in the machine. The ends of tape 200 in FIGURE 5, of course, extend to a suffiicent length to amply contain the longest control program signals; and is packaged in a suitable compact region in the machine.

*Magnetic tape circuitry and controls*

FIGURES 6 and 8 to 11 illustrate exemplary magnetic tape control systems in accordance with the invention hereof. The system of FIGURE 6 utilizes two magnetic tracks A and B on magnetic tape 200 and two magnetic heads 210, 211. The system of FIGURE 8 is similar, except that only one magnetic head and tracks but three and four magnetic heads respectively. In FIGURE 6 the template 212 is represented as a narrow band of light color material, with spaced dark marks 215, 216, 217, 218 representing positions for "stops" of the back gauge 105. Such template 212 is shown in position on the work table 100 of the cutting machine, in FIGURE 2. Any material with contrasting marks may be used such as dull material with reflective marks, dark material with light marks and others. Such sheet 212 may be of paper, plastic, metal or others and composition sheet varying from .003" to .125" as is convenient. The "stop" marks, as 215, are accurately imprinted, or drawn on individual template 212 for particular programs of cutting for the machine. A magnetic square plinth 109 is set against front ribs 107 of back gauge 105, to hold down template 212 onto table 100 in firm relation with the back gauge. The back edge (213) of template 212 is thus pressed against back gauge front edge of 107 and held by the magnetic clamping; and its side 214 aligned against the machine side gauge 109. As the back gauge 105 is motivated forwardly, the template 212 is firmly pushed in the forward direction, to the right, beneath the open knife blade and clamp.

An optical scanning unit 220 is used to scan template 212, for recording the program thereof on the magnetic tape 200. Such unit 220 is indicated in position over the template in FIGURE 1, at the front of the machine. The back gauge is motivated forwardly, desirably at its rapid rate, as the magnetic program of the "stop" positions can readily be recorded at such rate, e.g. 420" per minute by the invention system. The scanning of the marked "stop" positions 215 etc. on template 212 is schematically indicated by unit 220 in FIGURE 6. Unit 220 comprises a lamp 221 focused by lens 222 on the template 212 marking region, creating a beam 223 in exact line with the knife edge cutting position K, as indicated. Other phase relationships may be used between template and tape signals.

A dark mark as 215 passing beam 223 interrupts the normally reflected beam 224 to photo-electric cell 225. Beam 224 is collimated by lens 226, and passed through a narrow slit 227. It is realized that bright or reflective marks (215) can be instead used on a template (212) of dark color. A passing mark 215, etc. accordingly changes the beamed illumination intensity impinging upon cell 225, to in turn create a signal pulse therein. The exemplary cutter can trim-out $\frac{1}{32}$" between cuts. Hence marks (215 etc.) are drawn with a width of preferably half that, namely about .016". In practice, mark widths, i.e. in the direction of template travel, of .005" to .020" are contemplated, with .015" as desired. The corresponding width of slit 227 opening is made of the order of .006".

Such combination readily yields sharp or steep signal fronts at the photoelectric cell (225), which when shaped circuitally provides steep pules.

The photoelectric cell 225 may be of any desired type, a Clairex type CL 3A cadmium selenide being found practical and economical. The cell is suitably biased, and its signals amplified by pre-amplifier 228. With selector switch 230 in the "automatic" position 229, the signals are impressed on the A amplifier 231 which contains a limiter or clipper circuit to control peak levels of the signals. A pulse shaper and amplifier unit 232 thereupon provides a strong sharp pulse recording signal for the tape (200) track A, the "Stop" signal track. The control switch 235 is in the record position 234, conducting pulse signals when generated by a passing mark 215 (etc.) to the recording head 210.

Such "stop" pulse recording is synchronized on magnetic tape 200 with the knife K positions of the corresponding marks (215 etc.), as denoted in FIGURE 6. The head 210 position H on track A is in effective phase with the knife position K of the template 212. In practice, the K and H positions are physically separated. However, in view of the synchronized movement of tape 200 and back gauge 105 as described hereinabove (see FIGURE 5), the template 212 is also in synchronism with the tape 200. In this manner, each "stop" pulse signal 216a, 217a etc. recorded on track A is in phase with the corresponding "stop" marks 216, 217 etc. Subsequent pick up of these stop signals, and control of the back gauge stopping action therewith, will thereby precisely reproduce signals on tape 200 for the cutting program marked on template 212.

Moving control switch 235 to the read position 236 connects magnetic head 210 to the input of a suitable A amplifier 237 of picked up stop pulses 215a, 216a, etc. The pulses are picked up when tape 200 is moved past head 210 on the forward movements of the back gauge in its stack cutting operation. In the illustrated tape, pulse 218a precedes pulse 216a, etc. The amplified read signals are passed to the "stop" relay amplifier 238. The output 239 of amplifier 238 is connected to energize a "stop" relay 239a, wherein (as will be set forth), the energy to both drive clutches 171, 172 (FIGURES 5 and 7A) is thereby cut-off, and the drive of back gauge 105 stopped.

An important feature of the present invention is to substantially decelerate the back gauge forward speed through magnetic signalling, for a predetermined short interval before the "stop" pulses are reached. Towards this end a "slow" signal is impressed upon the magnetic control tape (200) just preceding each stop signal thereon. The "slow" signals in turn control the actuation of a "slow" relay connected with the back gauge drive (125), to effect a slow motive drive therefor. This is readily accomplished by energizing relay 171 of low-speed clutch 160 while releasing relay 172 (see FIGURES 5 and 7A). The back gauge drive will thereupon be at about 12" per minute, by the low speed drive of 25 r.p.m. in the above example, rather than at 900 r.p.m. for the 420" per minute forward rate (as will be set forth).

In practice I have found that a slow drive interval of about one inch travel of a commercial back gauge is sufficient to satisfactorily decelerate it for "dead" stoppage upon a subsequent "stop" signal. Such one inch travel corresponds to a one-seventh of a second interval at the normal forward rate of seven inches per second. On the tape 200 of FIGURE 6 the "slow" areas ahead of each "stop" signal (216 etc.) are arranged on a companion track B, and indicated at 250 and 251. The basic one-inch (or one-seventh of a second interval at fast rate), is indicated as Δ in length. The "slow" signal area is thus Δ long.

The area 251 however is Δ long only ahead of stop signal 218a, and extends further by the region Δ' unto adjacent stop signal 217a. Such extended "slow" signal areas are used in each case where successive stop signals are less than the predetermined interval Δ apart, here by 1″.

The fast forward movement of back gauge is thereby not initiated unless it can be slowed down in the Δ interval ahead of each "stop" signal as later described. This feature permits trim out cuts without speed ups and overshoots.

The control record-making system, circuitry and procedures hereof are arranged to effect "slow" signal areas in the hereinabove described form. Control switch 235 is moved to the dotted position 235a, and contact 236 for connection to read A amplifier 237. Control switch 240 is connected to record position 241. Magnetic head 211 is thereby connected to the output of the B track recording amplifier 242. Switch 243 is closed on contacts 244 connecting head 210 to head 211 through a time delaying circuit 245 to the "stop" pulse read (A) amplifier 237.

In recording the "slow" areas on tape 200, in the system of FIGURE 6, the template is removed after the "stop" signals are recorded on track A. Then the back gauge and tape 200 are moved in the "reverse" direction, at the same 420″ per minute rate. Whenever a "stop" pulse signal, as 216a passes head 210, the read pulse is amplified at 237 and impressed on time delaying unit 245. During a designed interval thereafter, unit 245 activates electronic gate 246 to send signals from oscillator 247 into B amplifier 242. These signals at oscillator (247) frequency are thereby suitably amplified and impressed on magnetic head 211 for the duration that delaying unit 245 is active or alive. In the exemplary system the unit 245 has an active delaying life of one-seventh of a second after each "stop" pulse is impressed upon it from A amplifier 237. The exemplary oscillator (247) frequency is of the order of 10,000 to 25,000 cycles per second. Other values may of course be used.

The "slow" signal area 250 is accordingly one-inch long (Δ), as the reverse 7″ per second travel of track B is recorded for 1/7 second. The basic "slow" signal is thus recorded at 10 kilocycles. Such high initial frequency is recorded so that an appreciable frequency is still in effect when the "slow" drive of 12″ per minute occurs during the slowed forward control drive. The "slow" control frequency picked up from track B starts at 10 kilocycles. However, as the back gauge and therefore the tape speed are reduced by one-thirty-sixth in the exemplary drive, the "slow" control frequency finally picked up becomes 275 cycles per second. All frequencies in this range are readily detected and used for control of the "slow" relay 257a.

In operating the back gauge and cutting machine with the invention system, the control tape 200 is motivated in the forward direction, as indicated. Before each "stop" signal reaches track A head 210, a corresponding "slow" signal area reaches the track B head 211 prior thereto. Thus "slow" signal area 250 is read by B track head 211 prior to "stop" pulse by A track head 210. During the control cycles both control switches are at the "read" positions: switch 235, at position 235a with contact 236; and switch 240, at position 240a with contact 248. The control signal (250) is impressed upon B amplifier 255 that reads the "slow" signal, amplifies it, and impresses the resultant control signal on "slow" relay amplifier 256.

Amplifier 256 also contains a detector that responds to the varying "slow" signal frequencies being picked up. As stated above, the exemplary "slow" signals recorded on track B is 10,000 cycles per second for a 420″ per minute track speed. When the back gauge and track is slowed down to 12″ per minute, the frequency picked up becomes 275 cycles per second. The amplifiers 255, 256 and the detector therein are made to be readily responsive to this range of frequencies. The output of unit 256 is connected by lead 257 to energize the system "slow" relay 257a (see FIGURE 7A). Such energization starts just as the "slow" control areas (250, 251) of track B are read, and is maintained until the "slow" areas just pass the B track head 211.

It is noted that the "stop" signal 216a on track A is positioned to be read by the A track head 210 just as the corresponding "slow" signal area has been fully read or leaves B head 211. Thus the "stop" relay 239a, through amplifiers 237, 238 is directly energized as the "slow" drive cycle is completed (see FIGURE 7A). The back gauge, being at the slowed down speed thereupon stops, accurately positioned by the corresponding stop signal position. The operator thereupon presses the usual "knife" operating button to effect the cutting cycle on the pile of sheets. A green signal light may be energized when the stop relay is actuated, to alert the operator. After the cutting operation, the operator manually presses the "fast" start button 248 to close on contacts 249 and energize clutch coil 172 and high speed clutch 161 (as described in connection with FIGURE 7A hereinafter). The back gauge is thus again moved forward at its fast rate, and maintains its speed until the next successive "slow" signal area is read by the system. When the cutting program is completed the operator either pushes the reverse button 191 (see FIGURE 5), or a limit switch is activated at the end of the back gauge movement, whereby associated circuitry (not shown) is employed to cut-out all forward circuits, including action by the magnetic control amplifiers in the reverse traverse of the back gauge.

A further important feature is the incorporation of the extended "slow" signal areas, as area Δ′ of signal 251 in track B, to take care of "trim" out operations. The "slow" relay 257a energization by lead 257 is maintained thereby, past the "stop" signal 218a until the position just before the next "stop" signal 217a, for the duration of the Δ′ interval (251). However, the "stop" signal 218a, being read by head 210 on the A track, energizes the "stop" relay, 239a (FIGURE 7A) through lead 239, and the back gauge is stopped. After the cutting operation, the back gauge is restarted forward by either a manual or automatic switching. As motion of the tape 200 is required in order for any recorded signal on tracks A, B to be picked-up, the back gauge is always restarted in "slow" speed for a period corresponding to 1/16″ on tape 200, through a time delay relay (not shown). In this case, upon such restarting action, the "slow" relay is immediately energized by the Δ′ area signals. The back gauge accordingly progresses at the slow speed until the stop signal 217a again stops the back gauge. When the back gauge is stationary, so is the control tape 200. The 1/16″ "slow" restarts of the back gauge permits the selective control action between tracks A, B.

Relay circuitry to effect the above described operations is readily apparent to those skilled in the art. The "stop" relay 239a, when energized by lead 239 from "stop" relay amplifier 238 in response to a "stop" signal impulse from track A, 216a, 217a, 218a, etc., is connected in the motor drive 125 to deenergize both clutch coils 171, 172 through their respective leads 164, 168 (see FIGURES 5 and 7A). Also these clutch coils are kept de-energized until the knife cutting operation is effected. The "stop" action is thereupon lifted either manually or automatically in response completion of the cut and return of the knife blade and knife clamp to their inoperative position above the work table. The "fast" clutch coil (172) is thereupon connected to be energized to motivate the back gauge forward. Upon reaching the next "slow" signal area, 250, 251, etc. the "slow" clutch coil 171 is energized through lead 257 and the "slow" relay 257a. The "fast" clutch coil 172 is de-energized at the same time. When the next "stop" signal on track A is reached the "stop" relay thereupon stops all drive to the back gauge.

Figure 7A:
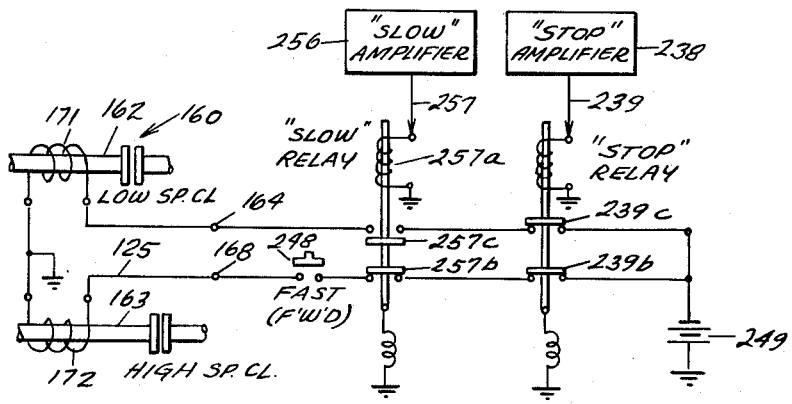
FIGURE 7A is a schematic showing of the automatic drive control circuit.

FIGURE 7A illustrates in schematic form circuitry to effect the aforesaid control actions on motor drive 125 through the magnetic system "slow" and "stop" relays 239a, 257a. Contact 164 extends from the low speed clutch coil 171; contact 168, from the high speed clutch coil 172 (see FIGURE 5). A common source of energy as battery 249 may be used for coils 171, 172. The de-energized position of control relays 239a, 257a is as shown in the diagram, with biasing springs therefor. Relay contactors 239b and 257b are closed on their contacts.

Thus, when "fast" contactor 248 is closed, either manually or automatically as a limit switch, the circuit between source 249 and "fast" clutch coil 172 is completed. The back gauge is thereupon moved forward at the high speed (except for the initial time delay of 1/16" trackage at the "slow" rate hereinabove stated). Upon subsequent, or prompt energization of the "slow" relay 257a through the aforesaid magnetic control action, contactor 257b "opens" and contactor 257c "closes." As the contactor 239c of the "stop" relay is also closed (normally) the "slow" clutch coil circuit becomes energized as the "fast" clutch coil is disconnected. The low speed clutch 166 thereupon drives the back gauge at the low forward speed.

When the "stop" amplifier 238 becomes energized, "stop" relay 239a opens its contactors 239b and 239c, to deenergize both clutch coils 171, 172. This serves as an override on any manual, automatic or magnetic control action on the clutches 160, 161, which prevents drive of the back gauge for the duration of the "stop" relay 239a energization.

In place of the photoelectric scanner 220 and preamplifier 228 (FIGURE 6), simple manual recording of the stop signals 215, 216, etc., may be employed. The switch 230 is closed on "manual" contact 252 in circuit with a battery 254 or equivalent source. Whenever push button switch 253 is closed, a signal pulse is transmitted into A amplifier 231. This corresponds to a scanned pulse obtained from template marks 215, 216, etc. The result through amplifiers 231, 232 is the same, in that a "stop" signal is impressed on magnetic tape 200. Back gauge 105 is motivated to the "stop" positions desired in a manual program operation; and kept stationary while the "stop" pulse is impressed on the also stationary tape 200. The successive "stop" pulses for the program are correspondingly made on tape 200 through the pressing of button switch 253 at each "stop" position. A condenser charged while switch 253 is open can be discharged into amplifier 231 in place of battery 254. The preparation of the track B "slow" area signals is accomplished during reverse travel of tape 200 in the manner above described.

FIGURE 7 is a circuit diagram of the portion of the tape control system of FIGURE 6 relating to time delay unit 245 and gate 246. In making the track B signals, the amplified read "stop" pulses (216a, 217a etc.) of track A are introduced to delaying unit 245 through amplifier 237 and closed switch 243, as seen in FIGURE 6. The pulses are fed to lead 259 and diode 260 in time delaying unit 245. Condenser 261 connects between diode 260 and ground lead 262. Resistor 263 shunts condenser 261. A second resistor 264 connects to the diode-resistor connection point 266 from negative bias lead 265. The time delaying circuit constant, one-seventh of a second in this example, is derived from selection of the parameters of resistors 263, 264, the diode 260 and condenser 261, in a manner well known in the art. Other desired delaying values are obtained by change of these parameters.

The "stop" pulse introduced to diode 260 thereby creates a signal of continuing duration of the delay $\Delta t$ period of one-seventh of a second. This delaying signal is directly amplified by a p-n-p transistor 270 suitably connected with resistors 267, 268, 269 and negative bias line 265. The output of transistor 270 is connected to the gate 246 through leads 271, 272. Gate 246 comprises two p-n-p transistors 273, 274 with their emitters interconnected by lead 275, and their collectors interconnected by the windings of coupling transformers 276, 277 to form a loop 280. The transistor bases are interconnected to input lead 271 through resistors 278, 279.

During the quiescent mode, no signal impinges on transistors 273, 274 from delaying unit 245, and the collector-to-emitter impedance across both transistors 273, 274 is very high to effectively cut-off the oscillator 247 signals in the gate loop 280. Upon signal activation of gate 274, the loop 280 becomes conductive and the 10 kilocycle oscillator (247) signals complete the circuit to the primary winding of transformer 276. A 10 kilocycle signal is thereby impressed on the B amplifier 242 for recording the "slow" signal areas on the B track of tape 200 (see FIGURE 6). The oscillator signal is passed by gate 246 to amplifier 242 for the duration of the effective life of the delayed pulse in delaying unit 245. As stated, a single "stop" pulse into unit 245 results in a one-seventh of a second "opening" of gate 246 and a one-inch "slow" signal (250) for the 420" per minute back gauge rate. Where two stop signals, as 217a, and 218a are closer together than such interval, the second "stop" pulse impressed on delaying unit 245 reinitiates in full the delay interval ($\Delta t$) which extends from the last pulse by the $\Delta t$ amount.

FIGURE 8 illustrates a modification of the two-track two-head system of FIGURE 6, utilizing a single track C and single head 285. The omitted circuit portion is the same as that of FIGURE 6. The control switch 286 is shown in position at contact 287, which is for both controlling the back gauge from a programmed track, or for creating the slow signal areas 290, 291, etc. on track C. The "stop" signals 292, 293, 294, etc. are recorded on track C through the scanning amplifier and shaper 232 units as in FIGURE 6 while switch 286 is in position 286a on contact 288. Moving tape 200 in the reverse direction, at its fast rate, passes the "stop" impulses into the A read amplifier 237, through low-pass filter 295. The A read amplifier 237 in turn impulses time delaying unit 245 through closed switch 243. The 10,000 cycle per second "slow" signal is thereupon gated to B record amplifier 242 as in the system of FIGURE 6, and impressed on the head 285 through filter 296 tuned to the 10 kilocycles. A record switch 297 is closed during the "slow" recording operation.

The single track (c) method utilizes a low pass filter 295 to prevent the high frequency, 10 kilocycles, from bypassing to the A amplifier 237. Also the tuned high frequency, 10 kilocycle, filter 296 prevents any high pulse signals passing beyond or interacting with amplifier 242 or the gate cricuitry. The recording of the 10 kilocycle signals on track C is made without biasing signals so that no deterioration of the already recorded "stop" pulses 292, 293, etc. occurs. The extended ($\Delta'$) "slow" signal area 291 is recorded as in the FIGURE 6 method, but right on top of the "stop" signal 294. The separation filters used herein effect the selective control action thereby.

In using the single track control system of FIGURE 8, the record switches 243 and 297 are opened, control switch 286 left on contact 287, and switch 298 is closed. A high pass filter 299 is responsive only to the "slow" signals from areas 290, 291, etc., and the low pass filter 295, only to the steep "stop" pulse signals 292, 293, etc. In the exemplary system, the low pass filter 295 passed all frequencies only from about 100 cycles down to D.C.; while the high pass filter 299 passed only frequencies from about 100 cycles up to 10 kilocycles and above. Thus the "slow" signal areas 290, 291, etc. activate only the B read amplifier 255 and the corresponding "slow" circuits controlled thereby; while the "stop" signals 292, 293, etc. pass only to the A read amplifier and actuate the associated "stop circuitry."

The single track system can also be used with two magnetic heads spaced apart a desired distance along the track, such as 1.5 inches. FIGURE 9 diagrammatically indicates such an alternative system, using a track D. The "slow" signal head 211' is positioned "ahead" to intercept the signals on track D ahead of head 210. Control switch 300 on contact 301 connects head 211' to high pass filter 299, as in FIGURE 8. The "slow" signal head is thus impervious to the "stop" pulses 305 on track D, and properly activates the "slow" control circuits 255, 256. Conversely, "stop" head 210 behind "slow" head 211' is connected to low pass filter 295, and selectively only activated "stop" circuitry 237 upon "stop" signals 305 passing head 210. It is noted that the "stop" signals (305) are space phased behind the end 307 of "slow" signal area 306 by the distance $\phi$, equal to the fixed displacement of heads 210, 211'. In this way, all the control relationships established by the described FIGURE 8 system are maintained herein, as will now be understood.

FIGURE 10 illustrates a system with two tracks E, F, using three heads 210, 211 and 310. This arrangement is similar to the two-head system of FIGURE 6 except that a third head, 310, is used to eliminate the use of a time delaying unit (245). This is accomplished by positioning head 310 by the desired interval $\Delta'$ behind the main "stop" signal head 210. When the initially recorded "stop" signals on track 5 are passed in reverse direction under heads 210 and 310, they are read at the $\Delta$ time apart. When the "stop" pulse signal is first read by head 210 it initiates the gating action at 246' through A amplifier 237 and switches 235a, 243. Head 211 commences to record the "slow" signal area on track F, and continues to do so until the same stop pulse reaches head 310. Amplifier 311 passes the new pulse to gate 246' which is arranged to thereupon cut off the oscillator signal (247) to head 211. Operation of the tape 200 and tracks E, F then is the same as for tracks A, B of FIGURE 6.

The two tracks (G, H) four head (210, 211, 310', 312) system of FIGURE 11 is basically similar to that of FIGURE 10 except that a fourth head (312) is utilized to record the "slow" signal control areas along track H in the forward direction and while the "slow" signals are recorded on track G. This is accomplished by positioning heads 310 and 312 ahead of main "stop" head 210 by the $\Delta$ interval, as indicated. Upon the initiation of a "stop" pulse through shaper amplifier 232 for head 210 and "stop" track G, a simultaneous pulse is transmitted from amplifier 232 to gate 246' through closed switch 243'. This sets off oscillator 247 signals into B record amplifier 242, and head 312 starts recording a "slow" signal area while tape 200 is progressing in the forward (scanning) direction. This recording continues until the initial corresponding "stop" signal recorded by head 210 is picked up by auxiliary head 310' on track G and impressed on gate 246' through amplifier 311. The "slow" signal area recording is stopped, and the composite slow-stop signals on tracks G, H are directly completed for subsequent control action as in the system of FIGURE 6.

The magnetic tape 200 is suitably based on 35 mm. motions picture film dimensions, with sets of sprocket holes 201, 202 on either longitudinal edge thereof (see FIGURE 6). Conventional finality magnetic coating is applied to the operating surface of tape 200. The sprocket drum 205 is thus a standard component for driving tape 200. The securement of drum 205 to an end section of the back gauge drive feed screw shaft 212 (see FIGURE 5) affords a precise positive drive for tape 200, synchronized with all movements of the back gauge 105.

The accurate control of the back gauge programming is thus facilitated. In the exemplary cutting machine, one revolution of the feed screw 112 effects a 1" motion to the back gauge. With the circumference of drum 205 approximately 4.5 inches, the tape 200 speed and travel is 4.5 times that of the synchronized back gauge. A different ratio therebetween may of course be employed.

The expanded travel of the synchronized tape 200 affords better magnetic signal control and improved accuracy as compared to a one-to-one ratio.

On the exemplary 35 mm. tape (200) width, it is practical to employ twenty-four independent magnetic control tracks. In the control systems of FIGURES 6, 10 and 11 utilizing track pairs, twelve distinct cutting programs are set up on one tape; and those of the single track systems, FIGURES 8 and 9 contain twenty-four separate programs. One readily shifts the magnetic heads transversely across the tape, to select the desired program tracks. The selector 126 (see FIGURE 1) has an indicator to point out its track position. It is desirable to have selector 126 at the front end of the machine (at right) with the other controls for the operator.

Once a program is recorded on a track position, it is charted, and used an indefinite number of times with identical program control operation. When it is desired to change a recorded program, one initially erases it magnetically by a suitable erase signal, and then records a new program in its place. The tape 200 lasts indefinitely, is readily replaceable in its transport means including drum 205, pulley 208, etc., (see FIGURE 5) by another program tape.

When it is desired to record a back gauge control program on the tape (200), the corresponding template 212 is positioned along side gauge 214 with back gauge 105 in its rearmost position. The magnetic square plinth is set against the elements 107 of the back gauge over the end 213 of the template (see FIGURES 1 and 2) to firmly hold the template as the back gauge is moved forward. The photo-electric scanning unit 220 is then set over the template 212 and in squared flush position against the forward clamp (with knife up) and the table 100, as indicated in dotted lines in FIGURE 1.

A groove at under side of unit 220 is provided for template 212 to pass under the optical section thereof, while the remaining base is flush on work table 100. Suitable magnetic clamps firmly hold scanner 220 in position during the scanning and recording operation. An electrical cable 203 extends from scanner 220 to energize it and interconnect its scanning circuitry with the magnetic control system (see FIGURE 6) housed in base 103. The scanning unit 220 and its cable 203 is placed in a convenient recess 204 in base 103 when not in use.

It is to be understood that in place of the removable scanner 220, one fixed onto the cutting machine at any practical location adjacent the template passage may be used. In the latter case, it may be arranged to be swung into location. Also, in place of a separate template for the program definition, one could scan the suitably printed top sheet on the pile to be cut.

In any event, the basic principles, features, arrangements and construction of the invention hereof are subject to variations and modifications by those skilled in the art, without departing from the spirit and scope of the invention as defined in the following claims.

I claim:

1. A cutting machine of the character described incorporating a work table, a cutting knife and a back gauge for moving a stack of sheets across the work table toward the cutting knife with a programmed series of stop positions along the work table comprising motor drive means for the back gauge, a magnetic control tape mounted on the machine, tape transport means for motivating said magnetic control tape in synchronism with the back gauge, electrical means responsive to control signals of different frequencies along the magnetic tape for controlling said drive means to successively slow down the back gauge responsive to one frequency just prior to the programmed positions and thereupon stop the back gauge at the programmed positions responsive to another frequency, and selector means for shifting said electrical means transversely of the magnetic tape for directly selecting indvdual control programs along the tape.

2. A cutting machine of the character described incorporating a work table, a cutting knife, and a back gauge for moving a stack of sheets across the work table toward the cutting knife with a programmed series of stop positions along the work table comprising drive means for the back gauge, a magnetic control tape mounted on the machine, transport means for motivating said magnetic control tape in synchronism with a back gauge and electrical control means responsive to control signals along the magnetic tape for controlling said drive means to successively stop the back gauge at the programmed positions, in which said drive means contains a high speed electromagnetic clutch and a low speed electromagnetic clutch selectively coupled to drive said back gauge at corresponding speeds and relay means operated by said electrical means and in circuit with said clutches for controlling said clutches in response to the control signals, in which a slow control signal is arranged to precede stop signals recorded on the tape to effect substantial slow down of the back gauge drive just prior to stopping actuations and thereby produce precise position stoppages of the back gauge, in which the "stop" signals on the tape are recorded as pulses, and the "slow" signals are recorded at a relatively high frequency to insure efficient detection thereof.

3. A guillotine type cutting machine of the character described incorporating a work table, a cutting knife and a back gauge for moving a stack of sheets across the work table toward the cutting knife with a programmed series of stop positions along the work table comprising motor drive means for the back gauge, a magnetic control tape mounted on the machine, including a longitudinal feed screw connected thereto, transport means for motivating said magnetic control tape, said transport means being connected with said feed screw to move the tape in synchronism with the back gauge, and electrical means responsive to control said signals along the magnetic tape for controlling drive means for successively slowing down the back gauge just prior to the programmed positions and thereupon stop the back gauge at the programmed positions, in which said drive means contains a high speed electromagnetic clutch and a low speed electromagnetic clutch selectively coupled to drive said feed screw at corresponding speeds, a slow relay operated by said electrical means and in circuit with said clutches for deenergizing the high speed clutch and energizing the low speed clutch in response to slow control signals, and a stop relay operated by said electrical means and in circuit with said clutches for deenergizing both said clutches in response to stop control signals, in which a slow control signal is arranged to precede the stop signals recorded on the tape to effect substantial slow down of the back gauge drive just prior to stopping actuations and thereby produce precise position stoppages of the back gauge, in which the "stop" signals on the tape are recorded as pulses, and the "slow" signals are recorded at a relatively high frequency and over a predetermined distance ahead of the "stop" signals to insure efficient detection thereof and sufficient extent of the slow down actions.

References Cited by the Examiner
UNITED STATES PATENTS

| | | | |
|---|---|---|---|
| 928,170 | 7/09 | Bassett | 346—134 |
| 1,263,365 | 4/19 | Bishop | 346—134 |
| 1,589,808 | 6/26 | McCann | 214—1 |
| 1,789,151 | 1/31 | Moore | 214—1 |
| 2,249,324 | 7/41 | Potter | 346—34 |
| 2,540,024 | 2/51 | Brand | 346—33 |
| 2,860,705 | 11/58 | Thumim | 214—1.6 |
| 2,871,088 | 1/59 | Abell | 346—1 |
| 2,919,969 | 1/60 | Luhn | 346—113 |
| 2,951,736 | 9/60 | Black | 346—1 |
| 2,976,372 | 3/61 | Sampson | 179—100.2 |
| 2,992,578 | 7/61 | Hribar | 83—71 |
| 3,012,104 | 12/61 | Kleis | 179—100.2 |

ANDREW R. JUHASZ, *Primary Examiner.*
WILLIAM W. DYER, JR., CARL W. TOMLIN,
*Examiners.*